(12) United States Patent
Saville et al.

(10) Patent No.: US 9,039,032 B2
(45) Date of Patent: May 26, 2015

(54) FOLDABLE STROLLER

(71) Applicants: Derek Saville, Stockton, CA (US); Greg Cerny, Palo Alto, CA (US); Kyle A. Naydo, Mountain View, CA (US)

(72) Inventors: Derek Saville, Stockton, CA (US); Greg Cerny, Palo Alto, CA (US); Kyle A. Naydo, Mountain View, CA (US)

(73) Assignee: Graco Children's Products Inc., Atlanta, GA (US)

( * ) Notice: Subject to any disclaimer, the term of this patent is extended or adjusted under 35 U.S.C. 154(b) by 0 days.

(21) Appl. No.: 13/915,574

(22) Filed: Jun. 11, 2013

(65) Prior Publication Data

US 2014/0028003 A1 Jan. 30, 2014

Related U.S. Application Data

(60) Provisional application No. 61/661,784, filed on Jun. 19, 2012.

(51) Int. Cl.
*B62B 1/00* (2006.01)
*B62B 7/10* (2006.01)
*B62B 7/06* (2006.01)

(52) U.S. Cl.
CPC . *B62B 7/10* (2013.01); *B62B 7/066* (2013.01); *B62B 2205/18* (2013.01)

(58) Field of Classification Search
USPC ......... 280/33.993, 47.38, 639, 642, 643–644, 280/647–650, 658
See application file for complete search history.

(56) References Cited

U.S. PATENT DOCUMENTS

| | | | |
|---|---|---|---|
| 7,096,530 B2 * | 8/2006 | Goulet | 15/144.4 |
| 2012/0119457 A1 * | 5/2012 | Williams | 280/30 |

\* cited by examiner

*Primary Examiner* — John Walters
*Assistant Examiner* — James Triggs
(74) *Attorney, Agent, or Firm* — Lempia Summerfield Katz LLC (57) ABSTRACT

A stroller has a first frame part and a second frame part capable of movement between at least two positions relative to the first frame part. A push-pull mechanism has a push-pull element that directly or indirectly connects the first and second frame parts. Moving the first frame part causes the push-pull mechanism to move the second frame part. The mechanism can be employed on the stroller frame to assist in folding and/or unfolding the stroller.

20 Claims, 12 Drawing Sheets

FOLDABLE STROLLER

RELATED APPLICATION DATA

This patent is related to and claims priority benefit of U.S. provisional patent application Ser. No. 61/661,784 filed Jun. 19, 2012 and entitled "Foldable Stroller." The entire content of this prior filed application is hereby incorporated herein by reference.

BACKGROUND

1. Field of the Disclosure

The present disclosure generally relates to foldable strollers, and more particularly to a stroller frame assembly structure that folds up easily and compactly and to a stroller with a frame structure that employs a push-pull mechanism to assist in folding up or moving one or more portions of the stroller.

2. Description of Related Art

Strollers are known in the art that can fold up and be reconfigured from an in-use or set up configuration to a folded configuration for storage or transport. Such strollers can also be unfolded and reconfigured from the folded configuration to the set up or in-use condition for normal use. Many have tried to provide a stroller with a stroller frame that, when folded up, is compact so that it takes up less storage space than when in the set up condition and so that it is less cumbersome to handle and manipulate when folded up.

It is also known in the art to try and provide a stroller that can fold up to a compact folded configuration and that can unfold to the set up configuration relatively easily. Most still require a completely manual operation with no assistance provided by the stroller frame construction. The improvements typically are found in the configuration of the frame components to make folding and unfolding easier and to provide the compact folded configuration. Many such attempts have been made, but improvements can be attained.

SUMMARY

In one aspect according to the teachings of the present disclosure, a foldable stroller is movable between a folded configuration and an in-use configuration and can have a pair of frame sides. Each frame side can have a push bar with a lower end and an upper end, a front leg having an upper portion, and a guide section connecting the front leg and the push bar. The lower end of the push bar can be coupled to one end of the guide section and the upper portion of the front leg can be coupled to another end of the guide section. The push bar can move to a position retracted relative to the one end of the guide section and the front leg can move to a position retracted relative to other end the guide section in the folded configuration. The push bar can move to a position extended relative to the one end of the guide section and the front leg can move to a position extended relative to the other end of the guide section in the in-use configuration.

In one aspect of the disclosure, the stroller can have a bottom rail pivotally connected to a lower portion of the front leg. The front leg, the push bar, and the guide section can lie generally parallel with the bottom rail in the folded configuration.

In one aspect of the disclosure, the stroller can have a rear leg pivotable relative to the front leg and pivotally connected to the guide section. A bottom rail can be pivotally connected to a lower portion of the front leg. The front leg, the push bar, and the guide section can lie generally parallel with the bottom rail in the folded configuration. The rear leg can lie within a profile height of the bottom rail, the front leg, the push bar, and the guide section in the folded configuration.

In one aspect of the disclosure, the push bar and the front leg can each be telescopically slidable relative to the one end and the other end, respectively, of the guide section.

In one aspect of the disclosure, the push bar and the front leg can each be telescopically slidable within and relative to the one end and the other end, respectively, of the guide section.

In one aspect of the disclosure, the stroller can include a push-pull fold assist mechanism coupled to the push bar. The guide section and the front leg can be configured so that pushing the push bar toward the one end of the guide section can retract the push bar relative to the guide section and automatically retract the front leg relative to the other end of the guide section.

In one aspect of the disclosure, the stroller can include a push-pull fold assist mechanism coupled to the push bar. The guide section and the front leg can be configured so that pushing the push bar toward the one end of the guide section can retract the push bar relative to the guide section and automatically retract the front leg relative to the other end of the guide section. Pulling the push bar away from the one end of the guide section can extend the push bar relative to the guide section and automatically extend the front leg relative to the other end of the guide section.

In one aspect of the disclosure, the stroller can include a push-pull fold assist mechanism with one or more rollers carried on the frame side and one or more tape strips coupled to the push bar, the front leg, and/or the guide section.

In one aspect according to the teachings of the disclosure, a stroller can include a first frame part and a second frame part capable of movement between at least two positions relative to the first frame part. A push-pull mechanism can have a push-pull element directly or indirectly connect the first and second frame parts. Moving the first frame part can cause the push-pull mechanism to move the second frame part.

In one aspect of the disclosure, the push-pull element can have at least one tape strip and a roller carried on part of the stroller. The at least one tape strip can be routed around the roller and can have ends; one each connected to a respective one of the first and second frame parts. The at least one tape strip can be a metal tape strip.

In one aspect of the disclosure, the stroller can have a third frame part that is capable of movement between two positions relative to the first frame part or the second frame part. The push-pull element can be directly or indirectly connected to the third frame part.

In one aspect of the disclosure, the stroller can have a third frame part that is capable of movement between two positions relative to the first and second frame parts. The push-pull element can be directly or indirectly connected to the third frame part.

In one aspect of the disclosure, the push-pull element can have one or more metal tape strips routed around one or more rollers carried by the stroller.

In one aspect of the disclosure, the stroller can have a frame assembly movable between a folded configuration and an in-use configuration and can have a pair of frame sides. Each frame side can include one of the first and second frame parts.

In one aspect of the disclosure, the first frame part can be a push bar of a handle assembly and the second frame part can be a front leg. The push bar and the front leg can slide parallel to one another between an extended length in the in-use configuration and a retracted length in the folded configuration. The retracted length can be shorter that the extended length.

In one aspect of the disclosure, the stroller can have a guide section. The first frame part can be a push bar with a lower end coupled to one end of the guide section. The second frame part can be a front leg having an upper portion coupled to another end of the guide section.

In one aspect of the disclosure, the stroller can have a push bar that moves to a position retracted relative to one end of a guide section. A push-pull mechanism can move a front leg to a position retracted relative to another end of the guide section in the folded configuration. When the push bar moves to a position extended relative to the one end of the guide section, the push-pull mechanism can move the front leg to a position extended relative to the other end of the guide section in the in-use configuration.

In one aspect of the disclosure, the stroller can have a bottom rail pivotally connected to a lower portion of a front leg. The front leg, a push bar, and a guide section can lie generally parallel with a bottom rail in the folded configuration.

In one aspect of the disclosure, the stroller can have a rear leg pivotable relative to a front leg and pivotally connected to a guide section. A bottom rail can be pivotally connected to a lower portion of the front leg. The front leg, a push bar, and the guide section can lie generally parallel with the bottom rail in the folded configuration. A rear leg can lie within a profile height of the bottom rail, the front leg, the push bar, and the guide section in the folded configuration.

In one aspect of the disclosure, the push-pull mechanism can be housed in part within channels in the first and second frame parts.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The disclosed stroller and frame assembly is configured to improve upon prior foldable strollers. The disclosed stroller and frame assembly can fold up from a set up configuration to a compact, generally rectangular size and shape. The disclosed stroller and frame assembly can also can be folded and unfolded between the two folded up and unfolded configurations relatively easily. In one example, the disclosed stroller can have a frame assembly structure that permits these benefits. In one example, the disclosed stroller can employ a push-pull tape strip mechanism as a part of the structure of the frame assembly. The mechanism can help move portions of the frame assembly when a user manipulates one part of the frame assembly in order to assist in folding and unfolding the stroller. These and other objects, features, and advantages of the present disclosure will become apparent to those having ordinary skill in the art upon reading this disclosure.

Figure 1:
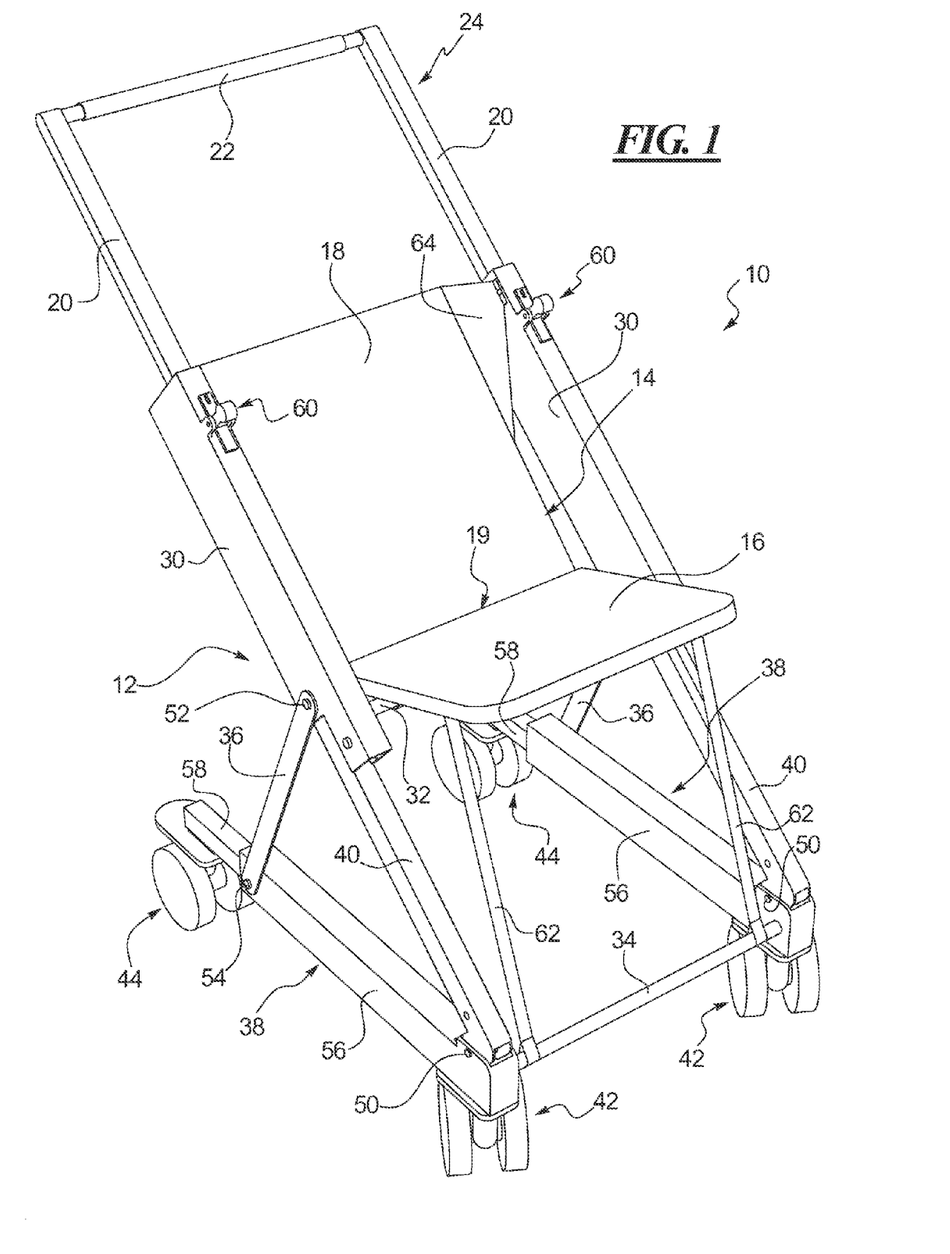
FIG. 1 shows a perspective view of one example of a stroller constructed in accordance with the teachings of the present invention and in a set up or in-use configuration.

Turning now to the drawings, FIG. 1 shows one example of a stroller 10 constructed in accordance with the teachings of the present invention. In one aspect of the disclosure, the stroller 10 can generally have a frame assembly 12 with two mirror image frame sides including a left frame side and a right frame side. Each of the frame sides can function in essentially an identical manner in this example. As a result, only one of the frame sides of the frame assembly 12 and the corresponding functional details are discussed in detail herein. The details and function of the other frame side are essentially the same.

The stroller 10 as shown in FIG. 1 can have a seat 14 supported by the structure of the frame assembly 12 between the left and right frame sides. The seat 14 can have a seat bottom 16 defining a bottom support surface and a seat back 18 defining a back support surface. The bottom and back support surfaces combine to define a seating surface for a seat occupant. The lower end of the seat back 18 and the rear end of the seat bottom 16 meet at a seat bight region 19.

The frame assembly 12 can include a number of frame parts or structural components that are configured to form the frame structure. The various parts or components can be pivotally connected to one another to permit the frame assembly to be folded and unfolded as described herein. Each frame side can have a push bar 20 extending upward and rearward relative to the stroller 10, using the in-use orientation of the stroller as a frame of reference. A transverse handle bar 22 can extend between the upper ends of the push bars 20. Together, the push bars 20 and the handle bar 22 can form a handle assembly 24 of the frame assembly 12 for pushing the stroller 10 during use.

Each frame side can have a guide section 30 connected to a lower end of the corresponding push bar 20. The frame assembly 12 can have a transverse seat cross bar 32 that extends beneath and supports the seat bottom 16. The seat cross bar 32 can extend between and be connected to the lower ends of the guide sections 30 and can be positioned near the seat bight region 19 of the seat 14. The frame assembly 12 can have a front cross member 34 that extends between the frame sides. The front cross member 34 can be positioned nearer the lower portion of the frame assembly 12 as noted further below. The frame assembly 12 can have a number of cross members and cross bars extending between the frame sides in order to add structural rigidity and strength to the stroller. The location, number, and relative positioning of the various cross bars and members can vary.

A rear leg 36 or strut can be pivotally connected to and extend downward and rearward from the lower end of the corresponding guide section 30 on each frame side. The frame assembly 12 can also have a bottom rail 38 on each of the frame sides. A lower end of each strut or rear leg 36 can be connected to its corresponding bottom rail 38 near the rear end of the bottom rail. The frame assembly 12 can further have a front leg 40 extending forward and downward from the lower end of the respective guide section 30. A forward end of the bottom rail 38 on each frame side can be connected to a lower end of the corresponding front leg 40.

In the disclosed example, the stroller 10 rests on a pair of front wheel assemblies 42 and a pair of rear wheel assemblies 44. The wheel assemblies 42, 44 can be directionally fixed or can swivel, as needed or desired, and as is known in the art. Each of the wheel assemblies 42, 44 can also include only a single wheel, dual wheels as shown, or a combination of single or dual wheels on the front or the back, as is also known in the art. The front wheel assemblies 42 can be carried on or mounted to or near the front ends of the respective bottom rails 38. The rear wheel assemblies 44 can be carried on or mounted to or near the rear ends of the corresponding bottom rails 38.

As will be evident to those having ordinary skill in the art upon reading this disclosure, the specific frame parts and components and their arrangement relative to one another can vary from the example shown and described herein. The shape, construction, and arrangement of the front and rear legs, the bottom rails, the guide sections, the push bars, and the handle bar can be changed and yet function as intended. The front and/or the rear wheel assemblies can be connected to the front and rear legs and not the bottom rails. The configuration and construction of the seat and its components, and the manner of mounting the seat to the frame assembly, can also be changed Additional changes and modifications can be made to the frame assembly 12 within the scope of the disclosure.

With reference to only one of the frame sides, the forward end of the bottom rail 38 can be pivotally connected to the lower end of the front leg 40 at a front leg pivot 50. The upper end of the rear leg 36 or strut can be pivotally connected to the guide section 30 at a rear leg pivot 52. Likewise, the lower end of the rear leg 36 or strut can be pivotally connected to the bottom rail 38 at a rail pivot 54. The bottom rail 38 can be split into two components including a fixed rail section 56 that can be connected to the front leg 40 and a slidable section or truck 58 that can carry the rear wheel assembly 44. The truck 58 can slide lengthwise, longitudinally, or telescopically relative to, alongside, beneath, over, outside of, or within the fixed section 56 when the stroller 10 is folded and unfolded as described below. The fixed section can instead be the rear portion and the slidable or movable section can be the front portion of the bottom rail.

Similarly, the lower end of the push bar 20 can be connected to the guide section 30 so as to be slidable lengthwise, longitudinally, or telescopically relative to, alongside, beneath, over, outside of, or within the guide section. A fold latch 60 can be provided on the guide section 30 near the upper end of the guide section. As discussed below, the fold latch 60 can be configured to fix the push bar 20 relative to the guide section 30 in a latched condition and to release the push bar relative to the guide section in a released or unlatched position. The upper end of the front leg 40 is connected to the guide section 30 so as to be slidable or movable lengthwise, longitudinally, or telescopically relative to, alongside, beneath, over, outside of, or within the guide section. The guide section 30 can act as a middle portion of an elongate length adjustable element with each end (push bar 20, front leg 40) being extendable and retractable relative to the guide section to increase or decrease the length of the adjustable element.

The seat bottom 16 of the seat 14 can be connected to a portion of the frame assembly 12 so as to control its movement as the stroller 10 is folded and/or unfolded. The seat bottom 16 can be tethered by two straps 62 or tethers to the front cross member 34 of the frame assembly 12. The seat back 18 can likewise be connected to a portion of the frame assembly 12 so as to control its movement as the stroller 10 is folded or unfolded. The seat back 18 can be connected or tethered by fabric portions 64 or flaps to the guide section 30.

Figure 2:
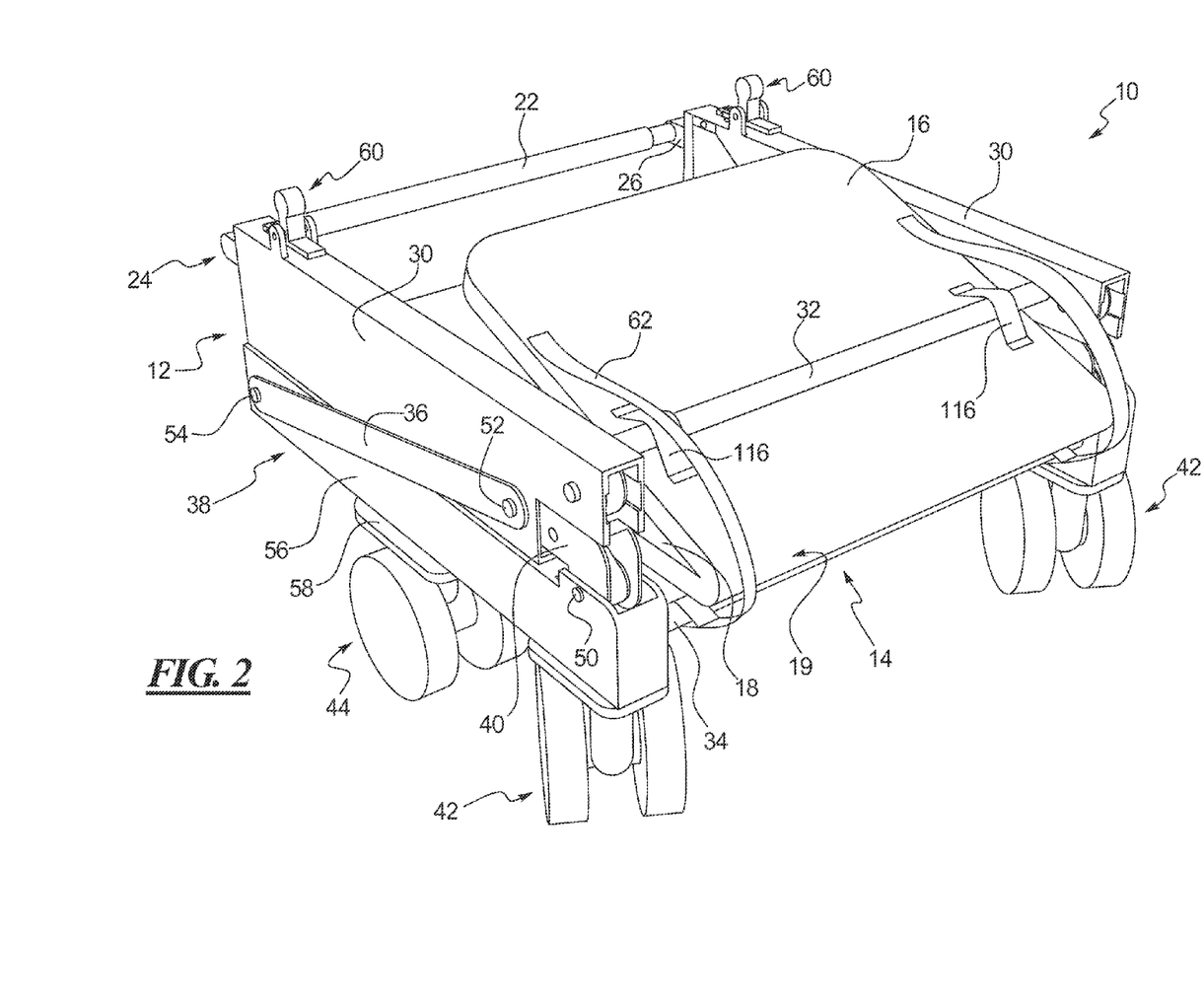
FIG. 2 shows a perspective view of the stroller of FIG. 1 but in a folded configuration.
Figure 3:
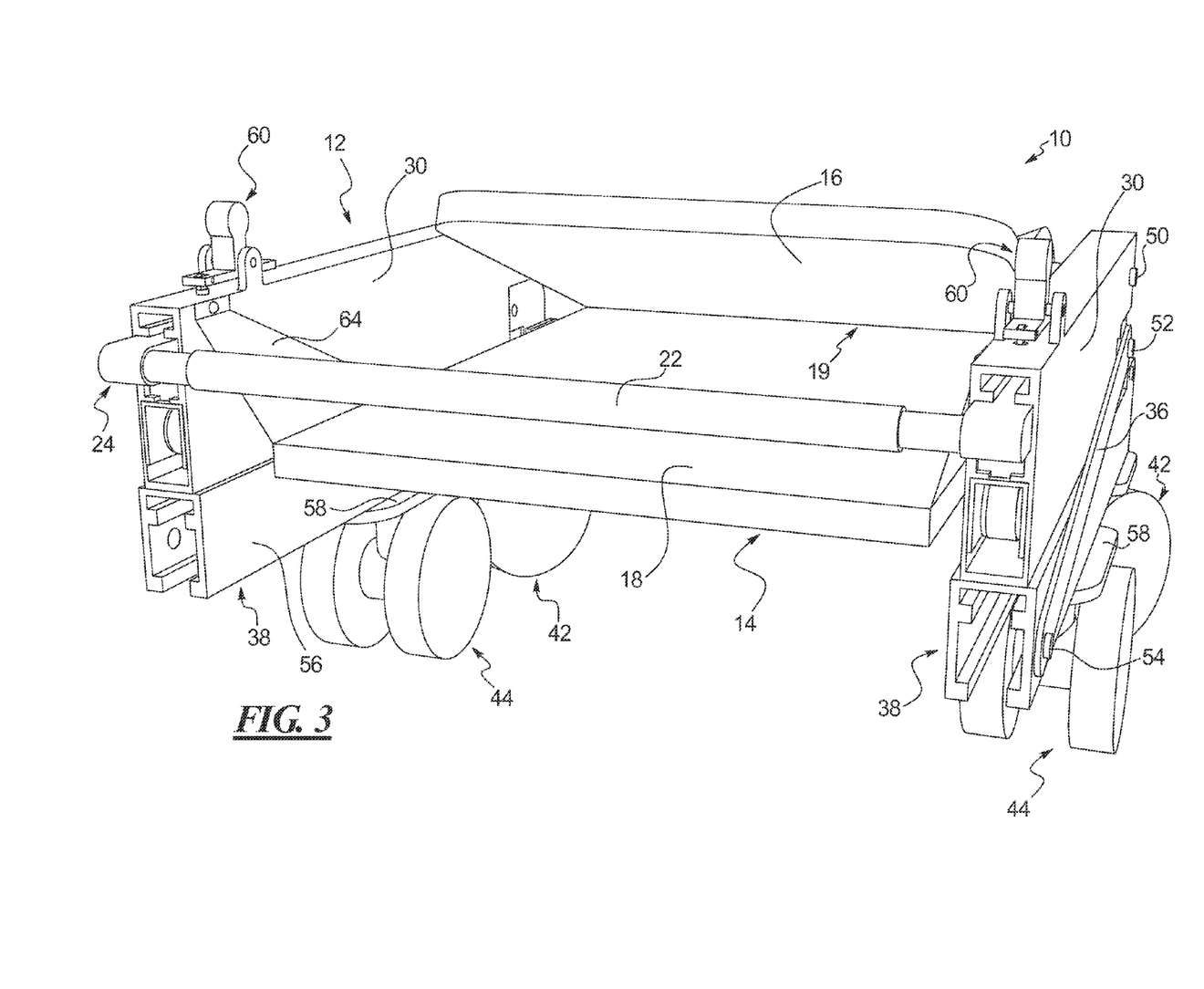
FIG. 3 shows a rear view of the folded stroller of FIG. 2.
Figure 4:
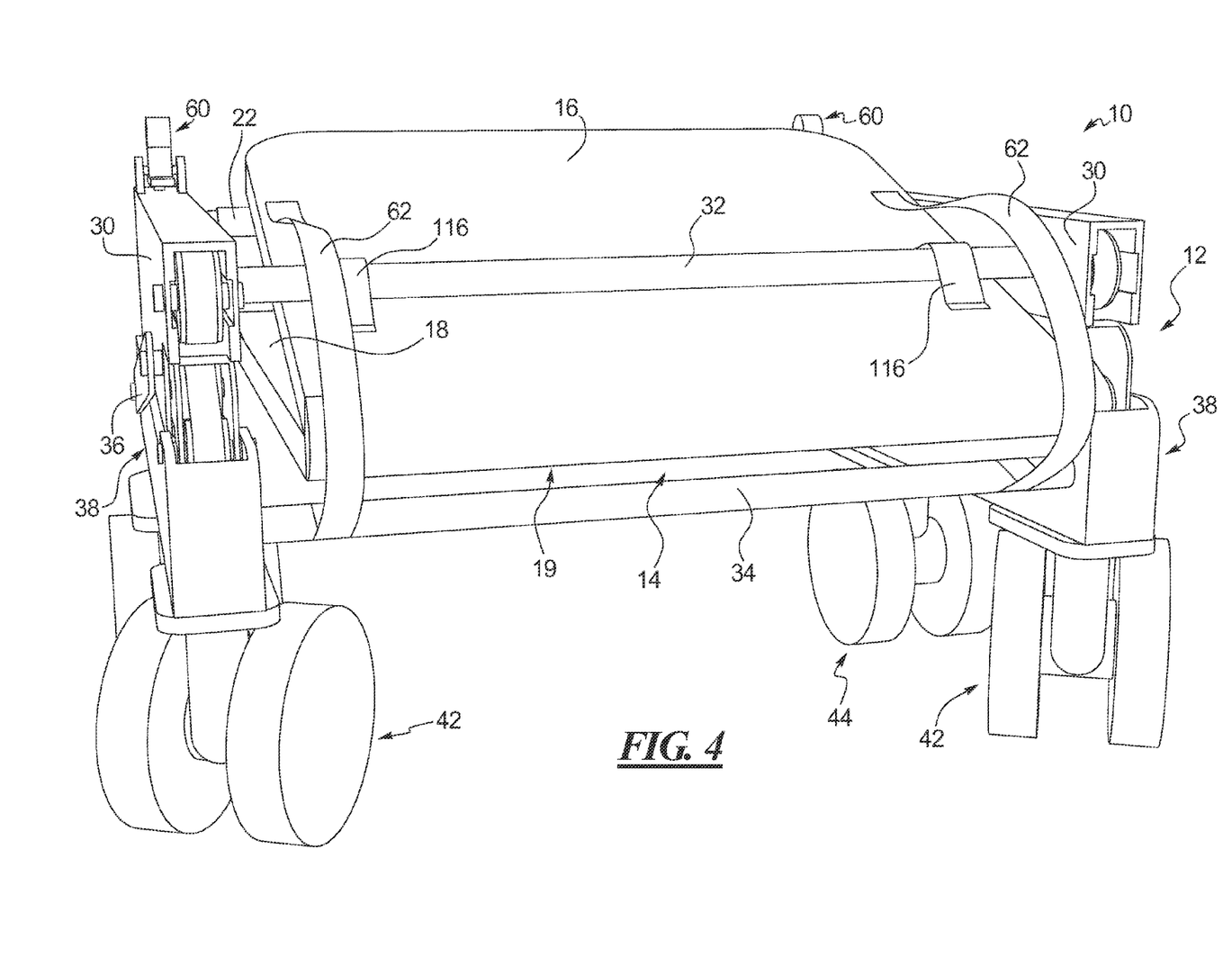
FIG. 4 shows a front view of the folded stroller of FIG. 2.

As described in greater detail below, the stroller 10 can be unfolded to a set up or in-use configuration as shown in FIG. 1 and can be folded to a compact configuration as shown in FIGS. 2-4. In order to do so, the user can disengage the latches 60 on the frame sides, which will release the push bars 20 for movement relative to the guide sections 30 on each frame side. In this example, two separate mechanical latches 60 are shown, somewhat generically. As will be evident to those having ordinary skill in the art, a number of different kinds of latches, latch structures, and release actuators can be utilized. Numerous strollers are known that employ a single release actuator on the middle of the handle bar between the push bars. The actuator can actuate two latches, one on each frame side via cables that are routed internally through the push bars and handle. Such a system can be utilized on the disclosed stroller 10.

According to the teachings of the present disclosure, the foldable stroller 10 and the frame assembly 12 can be movable between the unfolded in-use or set up configuration of FIG. 1 and the folded, compact configuration of FIGS. 2-4. The push bars 20 can be moved to a position substantially or partially alongside, over, under, or into the corresponding guide sections 30 in the folded configuration of FIGS. 2-4. The front legs 40 can be moved to a position substantially or partially alongside, over, under, or into the corresponding guide sections 30 in the folded configuration of FIGS. 2-4. The push bars 20 can also be moved to a position substantially or partially extending from, over, under, or out of the guide sections in the unfolded in-use configuration of FIG. 1. Likewise, the front legs 40 can be moved to a position substantially or partially extending from, under, over, or out of the guide sections in the unfolded in-use configuration of FIG. 1.

As in a disclosed example, each of the push bars 20, guide sections 30, and front legs 40 can be generally linear elements. The push bars and front legs can telescopically slide into and out of the guide sections 30 when the frame assembly 12 is folded and unfolded. When unfolded, the frame side can have a relatively long length because the push bar 20, guide section 30, and front leg 40 can all be extended relative to one another. When folded up, the frame side can have a relatively short length. The push bar 20 and front leg 40 can both be collapsed into the guide section 30, producing a relatively short length in the folded up configuration for the frame assembly.

As shown in FIG. 2-4, when the frame assembly 12 is folded up, the front leg 40 can be pivoted downward toward and onto and/or generally parallel with the bottom fixed rail section 56. The rear leg 36 or strut can pivot forward and downward relative and alongside and/or generally parallel with the bottom rail 38 has well. In one example, the rear leg 36 or strut can be positioned alongside the guide section 30 and bottom rail 38. This can allow the bottom rail 38 and guide section 30 to collapse directly onto or next to one another, creating a more compact folded configuration. By dropping forward and downward, the rear leg 36 also can allow the bottom rail to remain relatively short in the folded configuration. Also when folded up, the rear wheel truck 58 can slide forward along and into or within the bottom fixed rail section 56 toward the front wheel assemblies 42. This can shorten the length of the bottom rail 38 when the stroller 10 is folded up to the folded configuration.

The structure of the disclosed frame assembly 12 can provide a substantially compact folded up configuration for the stroller and can produce a relatively rectangular shape that is easy to manipulate and store, taking up less space. The seat bottom 16 can also fold up toward and against the seat back 18 in the folded up configuration. This can keep the seat 14 within the cube shape of the folded frame assembly 12. This seat arrangement can also protect the seating surface of the seat 14 from contamination or contact with dirty surfaces when stowed.

With reference to FIGS. 3 and 4, one can see that the bottom rail 38, guide section 30, front leg 40, and push bar 20 each can have a hollow interior that defines an elongate channel therein along the length of each component. In one example according to the teachings of the present disclosure, a push-pull fold-assist mechanism or system can be employed within the frame assembly 12, and particularly within these various component channels. The push-pull mechanism or system can be called a fold-assist mechanism that can be employed to assist in folding and/or unfolding the stroller. The mechanism can have a push-pull element directly or indirectly connected to a first frame part and a second frame part. The second frame part can be capable of movement between at least two positions relative to the first frame part. Moving the first frame part can cause the push-pull mechanism to move the second frame part. Such a mechanism can be employed on any number of movable stroller frame parts.

The fold-assist mechanism or system can include two separate sub-mechanisms or sub-systems on each frame side. The mechanism can instead include only one or more than two sub-mechanisms or sub-systems on each frame side. Each sub-system can include a plurality of wheels or pulleys, i.e., rollers that can be rotatably mounted within the channels of the frame components. Each sub-system can also utilize a length of a push-pull element, such as a push-pull cable or a metal tape similar to a measuring tape strip. The push-pull element or elements should be substantial enough to retain the general shape under tension and under compression, at least as long as the push-pull element is retained or constrained within the channels of the frame components. The push-pull element can include one or more metal tape strips, which can be curved laterally or transversely across a width, similar to a measuring tape, when in a linear or straight arrangement. The metal tape strip or strips can then also easily bend axially around the rollers, rendering the one or more tape strips flat in the width-wise direction.

Figure 5:
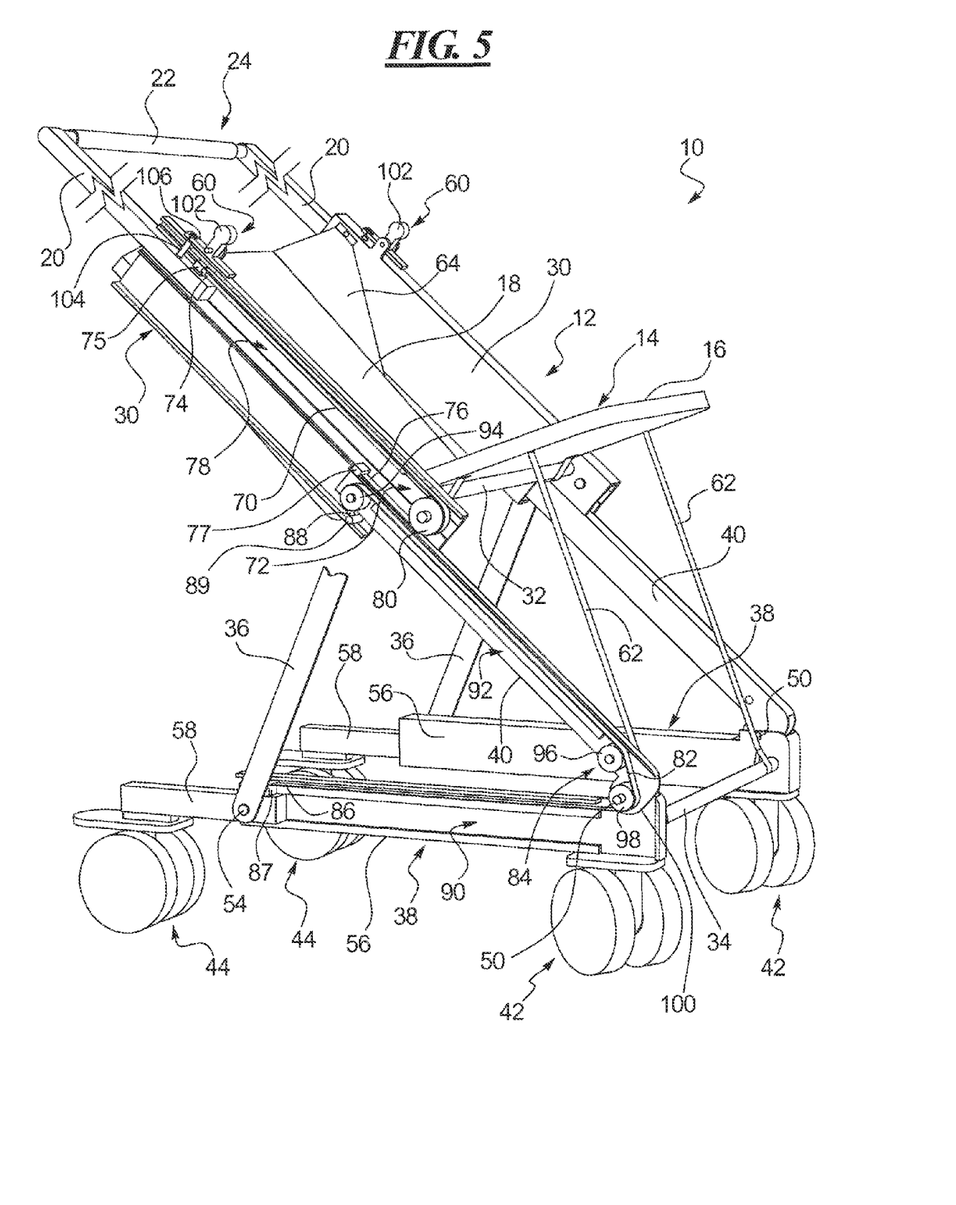
FIG. 5 shows a side perspective view, partially cut-away, of the stroller in the set up configuration of FIG. 1.
Figure 6A:
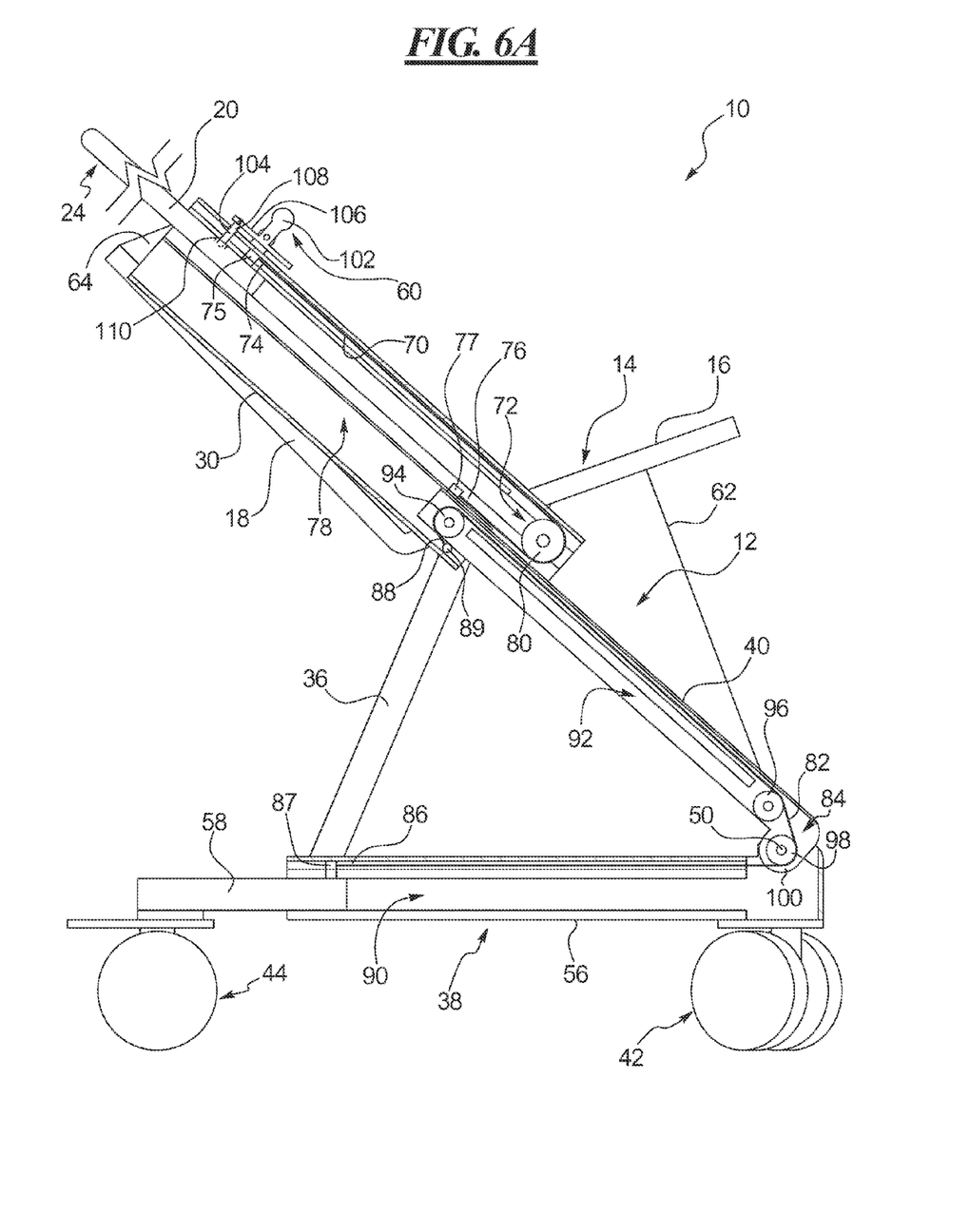
FIG. 6A shows a side cut-away view of the stroller in the set up configuration of FIGS. 1 and 5.

One example of a fold-assist or push-pull mechanism with a push-pull element in the form of two metal tape strips is illustrated and described with reference to FIGS. 5-8B. As shown in FIGS. 5 and 6A, a first tape strip 70 of a first sub-system 72 can have one end 74 fixed via a clamp 75 near the lower end of the push bar 20. The other end 76 of the first tape strip 70 can be fixed via a clamp 77 near the upper end of the front leg 40. The first tape strip 70 can be routed in a first channel 78 within the guide section 30 and can be wrapped or routed around a first wheel or roller 80 that can be carried at the lower end of the guide section.

A second tape strip 82 of a second sub-system 84 can have one end 86 fixed via a clamp 87 to the rear wheel truck 58. The other end 88 of the second tape strip 82 can be fixed via a clamp 89 to the lower end of the guide section 30. The clamp 89 can be near the rear leg pivot 52 on the guide section 30 and can be pivot axis of the first roller 80. The second tape strip 82 can be routed in a second channel 90 within the fixed section 56 of the bottom rail 38 and can be routed in a third channel 92 within the front leg 40. The second tape strip 82 can be routed or wrapped around a second roller or wheel 94, which can be affixed to the upper end of the front leg 40 within the third channel 92. The second tape strip 82 can also be wrapped around a pair of adjacent rollers, i.e., third and fourth rollers 96, 98, which can be provided near the forward end of the bottom rail 38 and the lower end of the front leg 40.

An arm or stub 100 is shown in FIGS. 5 and 6A and can extend from the lower end of the front leg 40 away from the axis of the front leg. The front leg pivot 50 can be located near a free end of the arm 100 and thus can be offset or spaced from a lengthwise axis of the front leg. This offset can place the front leg pivot on the bottom rail but allows the front leg 40 to lie on top of the bottom rail 38 when folded. The third roller 96 can be positioned on the front leg pivot 50. The fourth roller 98 can be positioned spaced from the third roller 96 and can be positioned within the third channel 92 within the front leg. The second tape strip 82 can be routed or wrapped around the third and fourth rollers within the channels 90, 92 so as not to interfere with pivoting motion between the bottom rail fixed section 56 and the front leg 40.

Figure 6B:
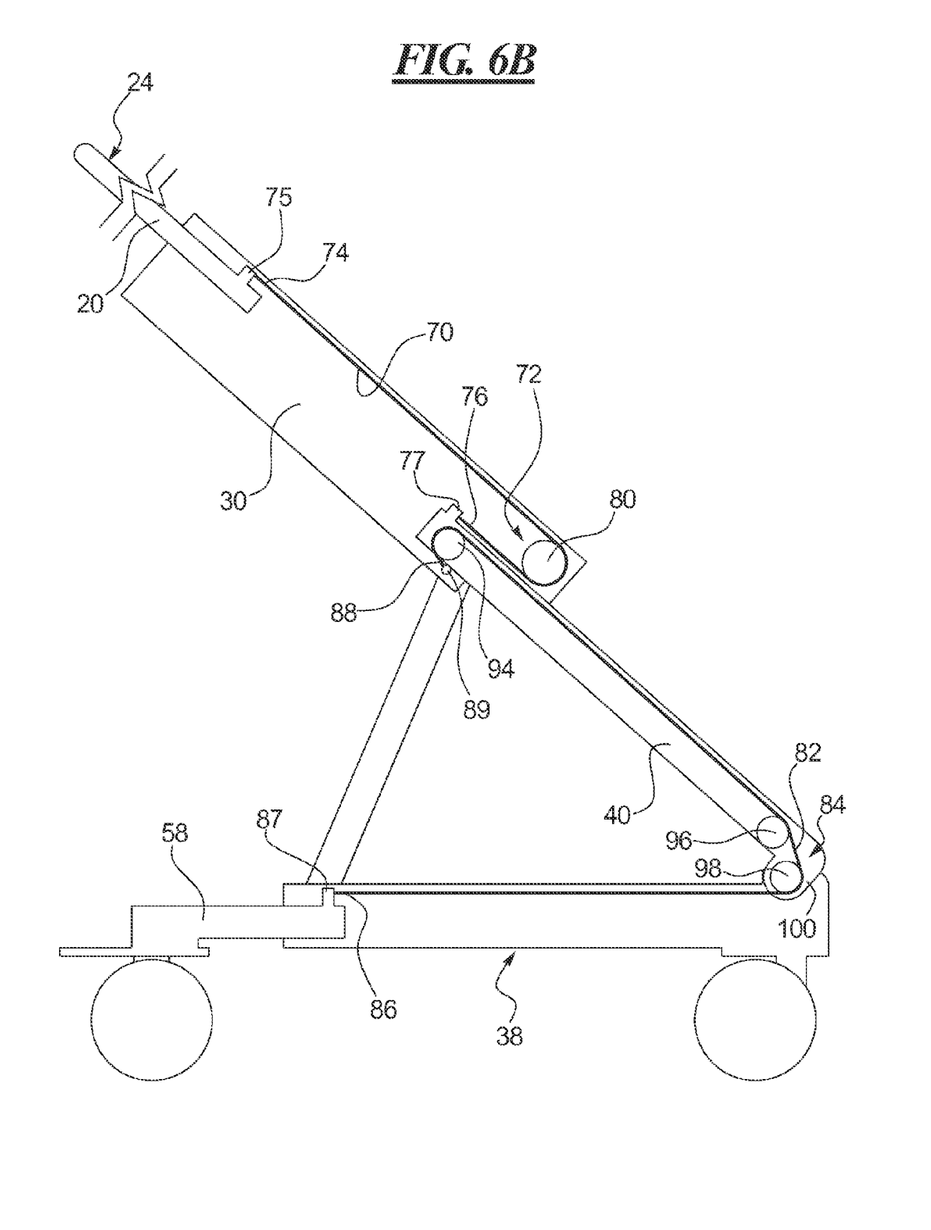
FIG. 6B shows a simplified schematic representation of the stroller of FIG. 6A.

The disclosed fold-assist or push-pull mechanism can assist in quickly and easily folding and unfolding the stroller 10. FIGS. 6A and 6B show the arrangement of stroller frame 12 with the stroller 10 in the set up configuration and the first and second sub-systems 72, 84, respectively, of the push-pull tape strip mechanism. The following is again described with reference to only one side of the frame assembly 12, the other side operating in the same manner in the disclosed example. The latch 60 can have an actuator handle 102 mounted to the guide section 30. The generic actuator 60 can be a toggle lever with a latch finger 104 projecting from a link 106 coupled to the actuator handle 102. The latch finger can extend through a hole 108 in the guide section 30 and seat in a latch opening 110 in the push bar 20 in the engaged or latched position. The latch finger 104, when the latch 60 is engaged, will prevent the push bar 20 from moving relative to the guide section 30 and thus retain the frame assembly 12 in the in-use or set up configuration and prevent the frame from folding up.

Figure 7A:
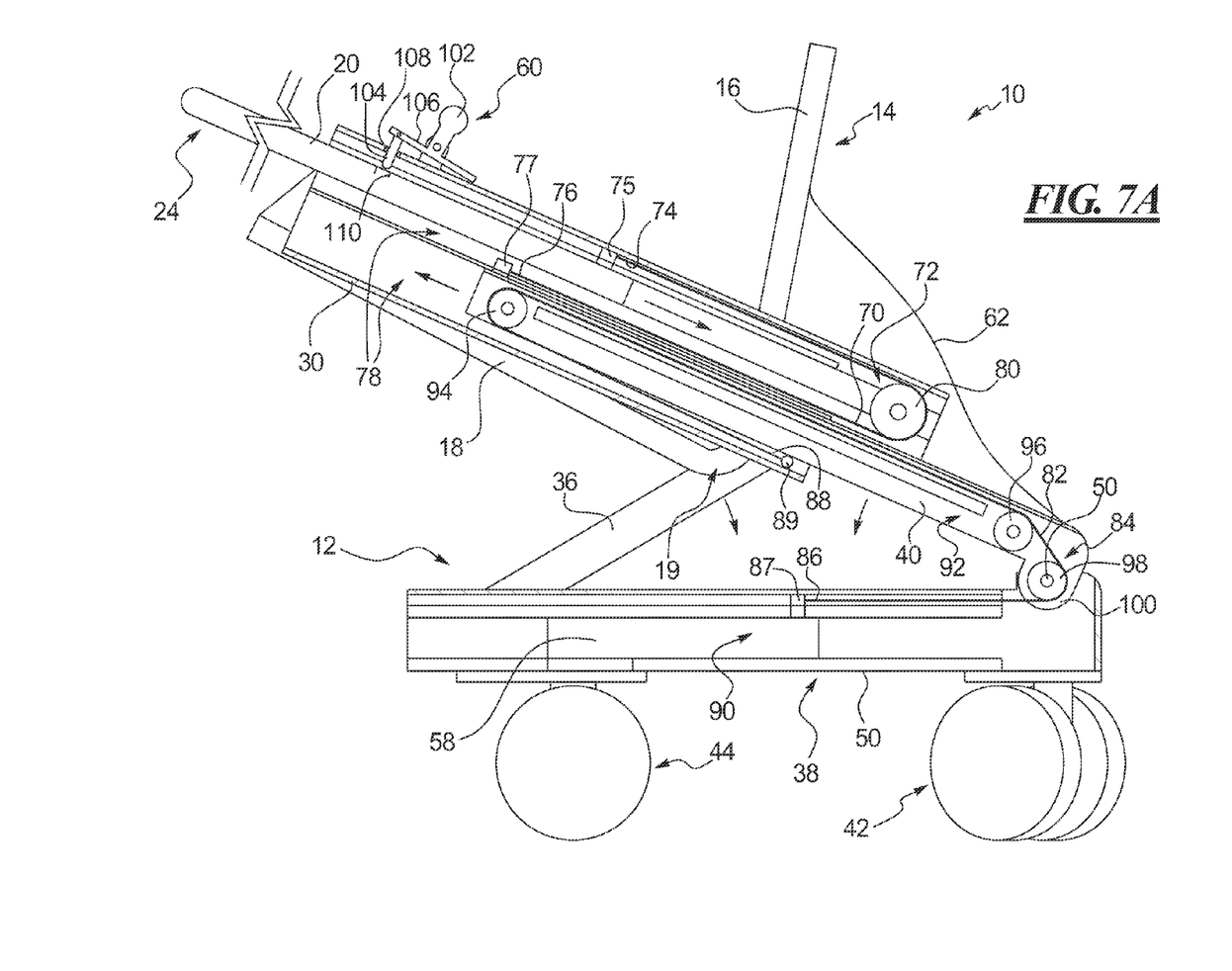
FIG. 7A shows the stroller of FIG. 6A, but in a partially folded configuration.
Figure 7B:
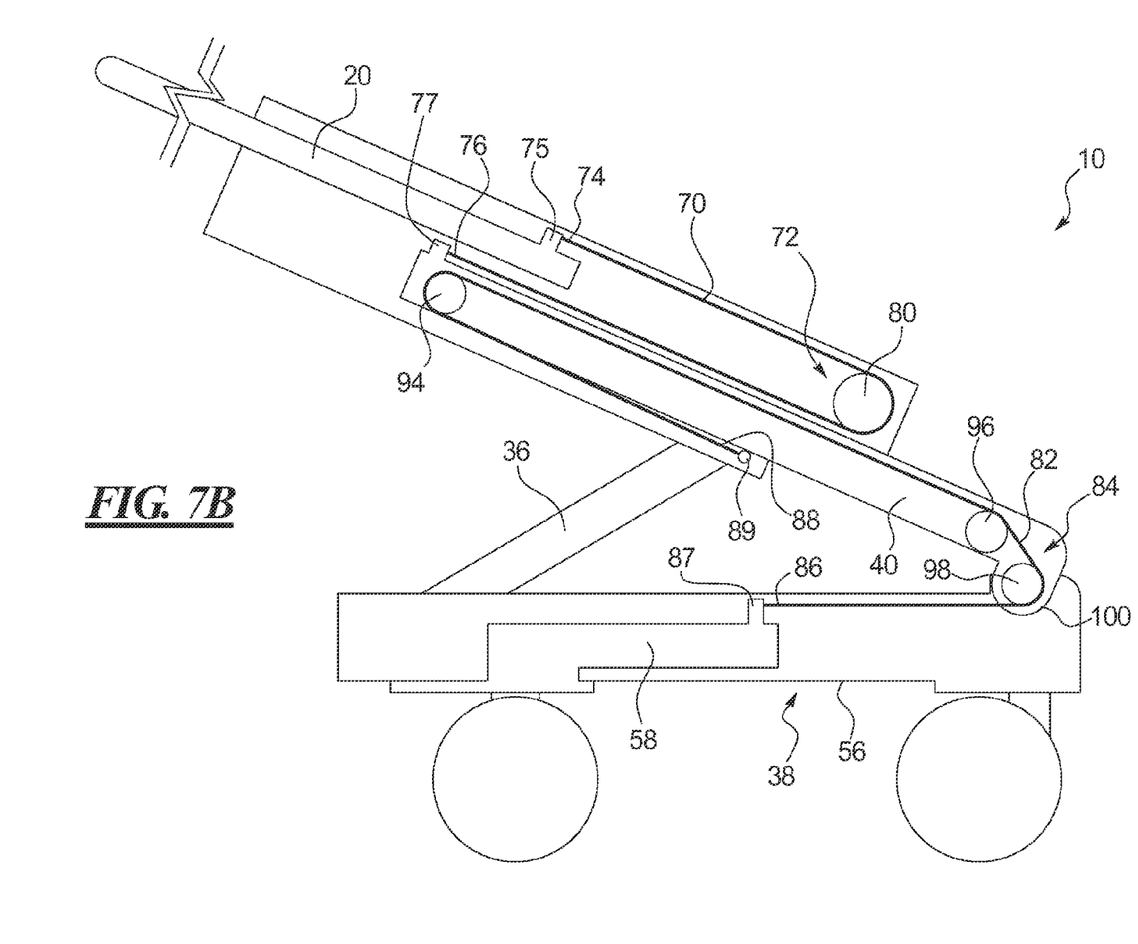
FIG. 7B shows a simplified schematic representation of the stroller of FIG. 7A.

In order to fold the stroller 10, the user must first disengage the latch 60 to release the push bar 20. The actuator handle 102 can be pushed or pulled to pivot the actuator 60 so as to disengage the latch finger 104 from the latch opening 110 in the push bar 20 (shown in FIG. 7A). When the latch 60 is released or disengaged, the push bar 20 is free to slide toward the guide section 30, and into the guide section in this example, as depicted in FIGS. 7A and 7B. To fold the stroller 10, the user can simply push the push bar 20 into the guide section 30. This can push the fixed end 74 of the first tape strip 70 along with the push bar 20 further into the guide section 30. The first tape strip will roll around the roller 80. The other fixed end 76 of the first tape strip 70, fixed to the upper end of the front leg 40, can cause the guide section 30 and the front leg to simultaneously slide toward one another. In this example, the other end of the guide section 30 slides over the front leg 40. This is because the first tape strip 70 has a fixed length between the clamped ends 74, 76 and, as it wraps around the first roller 80, acts as a single pulley sub-system. The first tape strip 70 can thus assist in simultaneously moving the other end of the guide section 30 toward and relative to the front leg 40 (since the front leg will be stationary) as the push bar 20 is pushed into the one end of the guide section. Thus, moving the push bar 20 into the upper end of the guide section 30 can also move the front leg 40 in the opposite direction and into the lower end of the guide section. This shortens the overall length of the combined push bar 20, guide section 30, and front leg 40 at a 2:1 ratio to the distance traveled by the push bar into the guide section. This can also reduce the load required by one-half to push the push bar 20 into the guide section 30, based on the single pulley arrangement of the first sub-mechanism or system 72

The one fixed end 86 of the second tape strip 82 is fixed to the rear wheel truck 58 and wraps around the third and fourth rollers 96, 98. As the other end of the guide section 30 moves relative to the front leg 40 during folding, the second roller 94 can move in the same direction rearward relative to the guide section 30 because the second roller is carried on the end of the front leg. However, the other fixed end 88 of the second tape strip 82 is fixed to the guide section 30 near the other end of the guide section. Thus, the second tape strip 82 can wrap around the second roller 94 and can be pulled into the guide section 30 as the front leg 40 slides along the guide section during folding. The one end 86 of the second tape strip 82 can thus pull the truck 58 and the rear wheel assembly 44 forward along the bottom fixed rail section 56 as the strip wraps around the third and fourth rollers 96, 98.

Figure 8A:
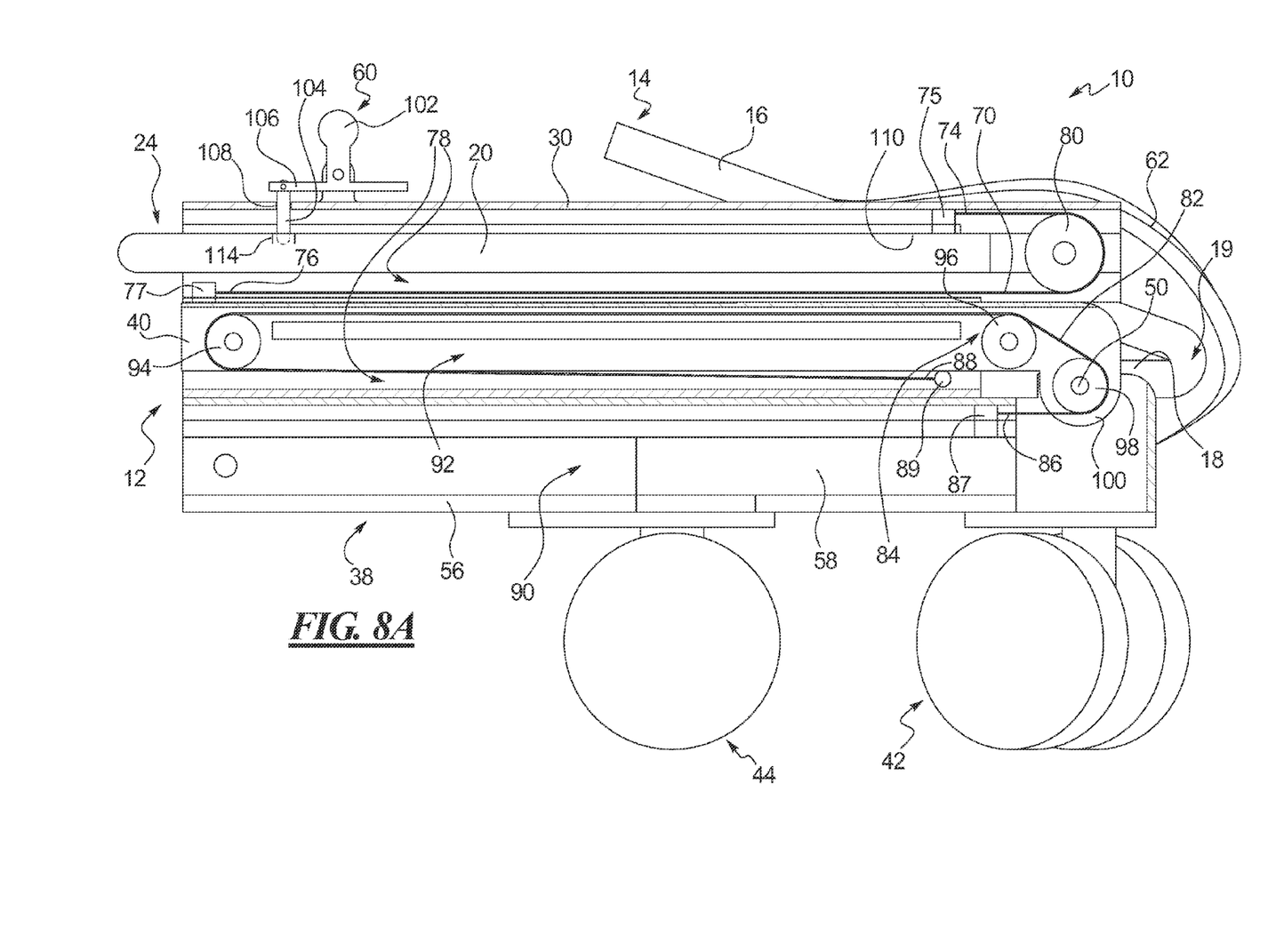
FIG. 8A shows the stroller of FIG. 6A, but in the completely folded configuration of FIGS. 2-4.
Figure 8B:
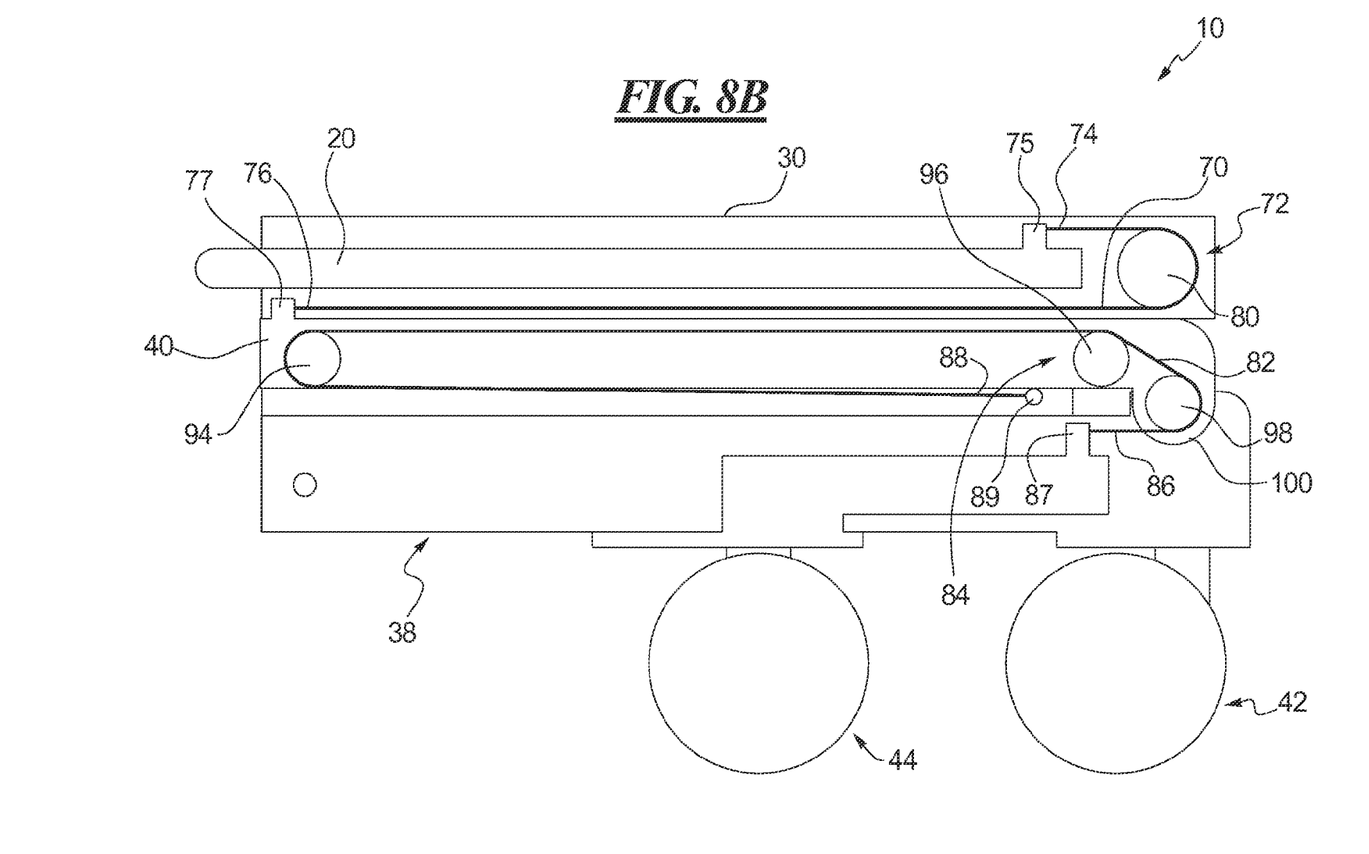
FIG. 8B shows a simplified schematic representation of the stroller of FIG. 8A.
Figure 9:
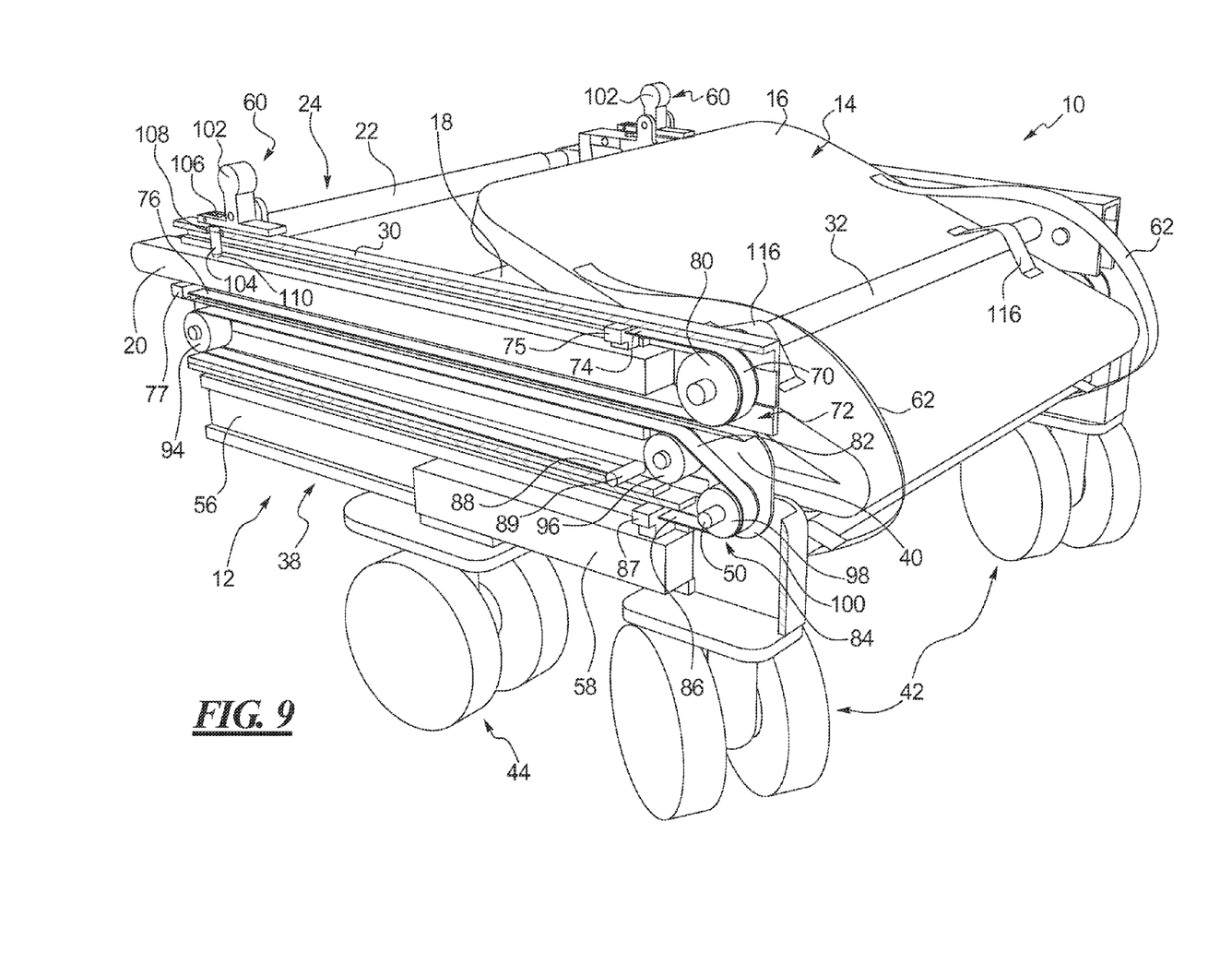
FIG. 9 shows a perspective view, partially cut-away, of the stroller of FIG. 8A in the folded configuration.

The upper end of the rear leg 36 is pivotally connected at the rear leg pivot 52 to the guide section 30. The rear leg pivot 52 is near the other, lower, end of the guide section 30 as shown in FIG. 1 and is fixed on the guide section 30. As the guide section 30 slides forward and down relative to the front leg 40, the rear leg pivot 52 moves in concert. As the pivot 52 moves, the rear leg 36 can pivot forward and downward toward the bottom rail 38. This in turn will drop the guide section 30 and pivot the front leg 40 down and rearward also toward the bottom rail 38. The change in arrangement of the two sub-systems 72 and 84 of the push-pull tape strip mechanism can be seen in the changes between the in use configuration of FIGS. 6A, 6B and the partially folded configuration of FIGS. 7A, 7B. The change in the relative positioning of the rear leg 36, front leg 40, push bar 20, and guide section 30 can also be seen. FIGS. 8A, 8B, and 9 show the stroller 10 in the completely folded configuration. In this configuration, the rear wheel truck 58 is drawn relatively far forward along the bottom rail 38 by the second tape strip 82. This helps to shorten the length of the bottom rail 38 in the folded configuration. The relatively excessive travel of the wheel truck 58 is a result of the relatively large distance in the folded configuration between the second roller 94 and the other fixed end 88 of the second tape strip 82 connected to the guide section 30.

As shown in FIGS. 2-4, 8A, 8B, and 9, the front leg 40, push bar 20, and guide section 30 are parallel to one another and can lie generally parallel to the fixed section 56 of the bottom rail 38 when folded. As shown, the front leg 40, push bar 20, and guide section 30 can be configured to lie on top of the bottom rail 38. However, other arrangements are possible. The rear leg 36 can lie closely alongside the bottom rail 38 and front leg 40, such as in this example, and not extend above or below the combined profile height of these two components. Again, other arrangements are possible. The shape, size, and confirmation of the frame assembly 12 and its various components and elements can be different and more elegant than those shown and described herein. The disclosed frame assembly 12 and stroller 10 is a fairly rudimentary structure depicted only to show the function and arrangement of the push-pull or fold-assist mechanism or system. The frame assembly 12 can be varied significantly from the example shown and described herein and yet function as intended.

When the user wishes to unfold the stroller 10, the user can again disengage the latch 60, if a storage latch feature is provided. As shown herein, the latch 60 can engage a storage latch opening 114 in the push bar 20 when in folded configuration. When the latch finger 104 of the latch 60 is released from the storage latch opening 114, the user can pull rearward and lift upward on the push bar 20. In doing so, the push bar 20 can extend rearward from the guide section 30. Simultaneously, the push bar 20 can pull the one fixed end 74 of the first tape strip 70 back toward the upper end of the guide section 30. This can also pull the first tape strip 70 around the first roller 80. The other fixed end 76 of the first tape strip 70 in turn can pull on the upper end of the front leg 40 in the opposite direction toward the lower end of the guide section 30. The first tape strip 70 can thus assist in unfolding the stroller 10, also at a 2:1 ratio relative to the push bar travel distance, and can reduce the force required to do so by one-half During unfolding, the user can also lift the push bar 20 upward away from the bottom rail 38. As the front leg 40 is extended from the lower end of the guide section 30 and as the guide section rises from the bottom rail 38, the front leg can pivot upward and forward toward its in-use orientation. The guide section 30 can also slide upward and rearward relative to the front leg 40. As the guide section 30 moves, the other fixed end 88 of the second tape strip 82 moves relative to the front leg 40 toward the second roller 94. This can push the one fixed end 86 of the second tape strip 82 rearward relative to the bottom rail 38. This can in turn slide the rear wheel truck 58 rearward relative to the fixed section 56 of the bottom rail 38. As the guide section 30 moves upward away from the bottom rail and rearward, the rear leg pivot 52 can also move, causing the rear leg 36 to pivot in concert it's in use orientation.

FIG. 9 shows a cut-away perspective view of the stroller 10 in the folded configuration. This image helps to visualize the push-pull tape strip mechanism arrangement. The seat 14 can be configured, along with the position of the seat cross bar 32, to automatically move the seat bottom 16 to the folded position as shown when the stroller 10 is folded. The seat bottom 16 can include one or more loops 116 attached to the underside. The seat cross bar 32 can be loosely captured by the loops 116 as shown in FIG. 2. The tethers 62 and loops 116 can be employed to pull the seat bottom 16 back to the position suitable for seating when the stroller 10 is moved to the set up configuration. The flaps 64 can move the seat back 18 in concert with the guide sections to which they can be attached. This can cause the seat back 18 to automatically return to an upright position ready for use.

As will be evident to those having ordinary skill in the art, the construction and arrangement of the stroller 10, including the frame assembly, the channels within the various frame components, the shape, configuration, and contour of the frame components, and the positioning and function of the tape strip mechanism can vary from the disclosed example and yet function as intended. The rollers or pulleys can be moved or positioned differently from the example shown. The routing of the tape strips can also vary from the example shown. It is possible that the push-pull mechanism utilizes only one tape strip on each frame side. It is also possible that the mechanism utilizes three or more tape strips on each frame side. The tape strip can be metal or can be fabricated of other suitable materials and can function to both pull under tension and push under compression so as to assist with moving the frame components during folding and unfolding.

As disclosed herein, a stroller can have a first frame part and a second frame part capable of movement between at least two positions relative to the first frame part. A push-pull tape strip or other push-pull fold assist mechanism or system can directly or indirectly connect the first and second frame parts. Moving the first frame part can cause the mechanism to move the second frame part. In this example, moving a first frame part, i.e., the push bar can move multiple additional frame parts, i.e., the guide section and/or front leg, the rear leg, the bottom rail, the rear wheel truck, and the like relative to one another during folding and unfolding of the stroller.

A product is known and produced by Shur-Line that is called the "Easy Reach Pole" and that is a paint roller extension handle product. The product utilizes a fully constrained metal tape and pulley system to allow easy manipulation of three telescoping handle elements. The metal tape allows the pole end to extend twice the distance of the user input. The disclosed stroller utilizes this basic concept for the push-pull tape strip mechanism or system. Use of such a mechanism can assist in folding the stroller more compactly and more easily with less user effort and movement. The mechanism can move components further than the input folding movement through mechanical advantage gained by the system or mechanism. Though a sliding or telescoping stroller handle configuration is used in this example, it is possible that a pivoting handle could also be utilized in conjunction with the disclosed tape strip mechanism.

In one alternative example, the first or upper tape strip sub-mechanism may be replaced with a loop providing tension in both directions. This might be beneficial, since the tape strips disclosed herein may need to be fully constrained along their entire length to prevent buckling. It is also possible that other mechanisms, such as a rack and pinion gear system could be used to replace one or the other of the sub-systems or mechanisms disclosed herein.

Using metal tape as the flexible push-pull elements is suitable because the tapes can go around bends yet stay rigid in both compression (push) and tension (pull). The first tape strip could be replaced with a looped wire or chain so that it is always in tension when manipulated in either direction. It may be possible for the second tape strip to also be so replaced by a loop. Products and geometry referred to as "push chains" also exist, which could possibly perform a similar function as the metal tapes disclosed herein.

The metal tapes or loops can be used to link stroller geometry to allow for a more compact fold with no extra effort required by the operator. It may be possible to also use the disclosed technology to remotely manipulate or deploy/stow a feature of the stroller, such as a storage basket, standing platform, tray, or the like when the user extends the stroller handle.

The disclosed foldable stroller offers ease of use to the consumer while also allowing for a more compact fold. Most compact folding strollers require additional manipulation by the user to achieve their compactness.

One or more springs may be provided in conjunction with the fold-assist mechanism or system. The springs can aid in moving the stroller from the folded to the unfolded configuration, from the unfolded to the folded configuration, or both. The spring or springs can be coupled to the ends of the tape strip or strips. The springs can be torsion or clock springs mounted with one or more of the rollers. An end of the tape strips can then be fixed to the sprung roller or rollers. Such springs can be added to further reduce the amount of force or effort required to move the stroller between configurations.

Although certain strollers, stroller frame assemblies, and fold assist mechanisms and systems have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A foldable stroller movable between a folded configuration and an in-use configuration and having a pair of frame sides, each frame side comprising:
   a push bar with a lower end and an upper end;
   a front leg having an upper portion;
   a guide section connecting the front leg and the push bar, the lower end of the push bar coupled to one end of the guide section and the upper portion of the front leg coupled to another end of the guide section; and
   a push-pull fold assist mechanism coupled to the push bar, the guide section, and the front leg,
   wherein the push bar moves to a position retracted relative to the one end of the guide section and the front leg moves to a position retracted relative to other end the guide section in the folded configuration,
   wherein the push bar moves to a position extended relative to the one end of the guide section and the front leg moves to a position extended relative to the other end of the guide section in the in-use configuration, and
   wherein the push-pull fold assist mechanism is configured so that pushing the push bar toward the one end of the guide section retracts the push bar relative to the guide section and automatically retracts the front leg relative to the other end of the guide section.

2. A stroller according to claim 1, wherein each frame side further comprises a bottom rail pivotally connected to a lower portion of the front leg, wherein the front leg, the push bar, and the guide section lie generally parallel with the bottom rail in the folded configuration.

3. A stroller according to claim 1, wherein each frame side further comprises:
   a rear leg pivotable relative to the front leg and pivotally connected to the guide section; and
   a bottom rail pivotally connected to a lower portion of the front leg,
   wherein the front leg, the push bar, and the guide section lie generally parallel with the bottom rail in the folded configuration, and wherein the rear leg lies within a profile height of the bottom rail, the front leg, the push bar, and the guide section in the folded configuration.

4. A stroller according to claim 1, wherein the push bar and the front leg are each telescopically slidable relative to the one end and the other end, respectively, of the guide section.

5. A stroller according to claim 1, wherein the push bar and the front leg are each telescopically slidable within and relative to the one end and the other end, respectively, of the guide section.

6. A stroller according to claim 1, wherein, on each frame side, pulling the push bar away from the one end of the guide section extends the push bar relative to the guide section and automatically extends the front leg relative to the other end of the guide section.

7. A stroller according to claim 1, wherein, on each frame side, the push-pull fold-assist mechanism includes one or more rollers carried on the respective frame side and one or more tape strips coupled to the push bar, the front leg, and the guide section.

8. A stroller comprising:
   a first frame part;
   a second frame part capable of movement between at least two positions relative to the first frame part; and
   a push-pull mechanism having a push-pull element directly or indirectly connecting the first and second frame parts, the push-pull element including at least one metal tape strip and a roller carried on part of the stroller, the at least one metal tape strip routed around the roller and having an end connected to each of the first and second frame parts,
   wherein moving the first frame part causes the push-pull mechanism to move the second frame part.

9. A stroller according to claim 8, further comprising a third frame part that is capable of movement between two positions relative to the first frame part or the second frame part, wherein the push-pull element is directly or indirectly connected to the third frame part.

10. A stroller comprising:
a first frame part;
a second frame part that is capable of movement between at least two positions relative to the first frame part;
a third frame part that is capable of movement between at least two positions relative to the first and second frame parts; and
a push-pull mechanism having a push-pull element directly or indirectly connecting the first, second, and third frame parts,
wherein moving the first frame part causes the push-pull mechanism to move the second and third frame parts.

11. A stroller according to claim 8, wherein the push-pull element includes a plurality of the metal tape strips and a plurality of the rollers carried by the stroller.

12. A stroller according to claim 8, further comprising a frame assembly movable between a folded configuration and an in-use configuration and having a pair of frame sides, each frame side including one of the first and second frame parts.

13. A stroller having a frame assembly movable between a folded configuration and an in-use configuration and having a pair of frame sides, each frame side comprising:
a first frame part;
a second frame part capable of movement between at least two positions relative to the first frame part; and
a push-pull mechanism having a push-pull element directly or indirectly connecting the first and second frame parts,
wherein moving the first frame part causes the push-pull mechanism to move the second frame part,
wherein the first frame part is a push bar of a handle assembly and the second frame part is a front leg, and
wherein the push bar and the front leg can slide parallel to one another between an extended length in the in-use configuration and a retracted length in the folded configuration, the retracted length being shorter that the extended length.

14. A stroller having a frame assembly movable between a folded configuration and an in-use configuration and having a pair of frame sides, each frame side comprising:
a first frame part;
a second frame part capable of movement between at least two positions relative to the first frame part;
a push-pull mechanism having a push-pull element directly or indirectly connecting the first and second frame parts; and
a guide section, wherein the first frame part is a push bar with a lower end coupled to one end of the guide section and the second frame part is a front leg having an upper portion coupled to another end of the guide section,
wherein moving the first frame part causes the push-pull mechanism to move the second frame part.

15. A stroller according to claim 14, wherein, on each frame side, when the push bar moves to a position retracted relative to the one end of the guide section, the push-pull mechanism moves the front leg to a position retracted relative to other end the guide section in the folded configuration, and wherein, when the push bar moves to a position extended relative to the one end of the guide section, the push-pull mechanism moves the front leg to a position extended relative to the other end of the guide section in the in-use configuration.

16. A stroller according to claim 14, wherein each frame side further comprises a bottom rail pivotally connected to a lower portion of the front leg, wherein the front leg, the push bar, and the guide section lie generally parallel with the bottom rail in the folded configuration.

17. A stroller according to claim 14, wherein each frame side further comprises:
a rear leg pivotable relative to the front leg and pivotally connected to the guide section; and
a bottom rail pivotally connected to a lower portion of the front leg,
wherein the front leg, the push bar, and the guide section lie generally parallel with the bottom rail in the folded configuration and wherein the rear leg lies within a profile height of the bottom rail, the front leg, the push bar, and the guide section in the folded configuration.

18. A stroller according to claim 8, wherein the push-pull mechanism is housed in part within channels in the first and second frame parts.

19. A stroller according to claim 3, wherein the push-pull fold assist mechanism is also coupled to the bottom rail.

20. A stroller according to claim 14, wherein the push-pull element of the push-pull mechanism is housed within channels in at least the front leg, the guide section, and the bottom rail.

* * * * *